US012003061B2

(12) United States Patent
Rossman et al.

(10) Patent No.: US 12,003,061 B2
(45) Date of Patent: Jun. 4, 2024

(54) GROUND STRUCTURE FOR A CABLE CARD ASSEMBLY OF AN ELECTRICAL CONNECTOR

(71) Applicants: TE Connectivity Services GmbH, Schaffhausen (CH); Tyco Electronics (Shanghai) Co., Ltd., Shanghai (CN)

(72) Inventors: Jared Evan Rossman, York Haven, PA (US); Megha Shanbhag, Sunnyvale, CA (US); Ping Wei, Shanghai (CN)

(73) Assignees: TE CONNECTIVITY SOLUTIONS GmbH, Schaffhausen (CH); TYCO ELECTRONICS (SHANGHAI) CO., LTD., Shanghai (CN)

(*) Notice: Subject to any disclaimer, the term of this patent is extended or adjusted under 35 U.S.C. 154(b) by 263 days.

(21) Appl. No.: 17/516,021

(22) Filed: Nov. 1, 2021

(65) Prior Publication Data

US 2023/0077720 A1 Mar. 16, 2023

(51) Int. Cl.
*H01R 13/6585* (2011.01)
*H01R 9/05* (2006.01)
(Continued)

(52) U.S. Cl.
CPC ....... *H01R 13/6585* (2013.01); *H01R 9/0515* (2013.01); *H01R 13/6589* (2013.01); *H01R 13/6591* (2013.01); *H01R 13/65912* (2020.08); *H01R 13/6592* (2013.01); *H01R 13/6594* (2013.01); *H01R 9/0512* (2013.01); *H01R 12/50* (2013.01); *H01R 12/51* (2013.01); *H01R 12/53* (2013.01); *H01R 12/722* (2013.01); *H01R 13/6581* (2013.01); *H01R 13/65914* (2020.08);
(Continued)

(58) Field of Classification Search
CPC .............. H01R 13/6585; H01R 9/0515; H01R 13/6589; H01R 13/6591; H01R 13/65912; H01R 13/6592; H01R 13/6594; H01R 9/0512; H01R 12/50; H01R 12/51; H01R 13/6581; H01R 13/65914; H01R 13/65915; H01R 13/6596; H01R 12/53; H01R 12/722
See application file for complete search history.

(56) References Cited

U.S. PATENT DOCUMENTS 8,840,432 B2 * 9/2014 Alden, III ............ H05K 1/0216 439/607.46
9,203,193 B2 * 12/2015 Hackman ............. H01R 13/648
(Continued)

FOREIGN PATENT DOCUMENTS

EP 867995 B1 * 7/2001 ............. H01R 24/64

*Primary Examiner* — Abdullah A Riyami
*Assistant Examiner* — Justin M Kratt

(57) ABSTRACT

A cable card assembly includes a circuit card having cable conductors at a cable end and cables terminated to the circuit card having signal conductors and ground shields surrounding the corresponding signal conductors to provide electrical shielding for the signal conductors. The signal conductors include exposed portions terminated to corresponding cable conductors. The cable card assembly includes a ground bus electrically connected to the ground shields. The ground bus includes a molded body having tunnels receiving the exposed portions of corresponding signal conductors. The molded body is contoured to control impedance along the exposed portions of the signal conductors.

20 Claims, 3 Drawing Sheets

(51) Int. Cl.

| | |
|---|---|
| ***H01R 13/6589*** | (2011.01) |
| ***H01R 13/6591*** | (2011.01) |
| ***H01R 13/6592*** | (2011.01) |
| ***H01R 13/6594*** | (2011.01) |
| *H01R 12/50* | (2011.01) |
| *H01R 12/51* | (2011.01) |
| *H01R 12/53* | (2011.01) |
| *H01R 12/72* | (2011.01) |
| *H01R 13/6581* | (2011.01) |
| *H01R 13/6596* | (2011.01) |

(52) U.S. Cl.
CPC .... *H01R 13/65915* (2020.08); *H01R 13/6596* (2013.01)

(56) References Cited

U.S. PATENT DOCUMENTS

| | | | | |
|---|---|---|---|---|
| 9,437,949 | B2 | 9/2016 | Behziz et al. | |
| 10,170,862 | B2 | 1/2019 | Weidner et al. | |
| 10,498,085 | B2 | 12/2019 | Dill, III | |
| 2016/0276759 | A1* | 9/2016 | Tran | H01R 13/6592 |
| 2017/0040746 | A1* | 2/2017 | Zhang | H01R 13/6594 |

* cited by examiner

GROUND STRUCTURE FOR A CABLE CARD ASSEMBLY OF AN ELECTRICAL CONNECTOR

BACKGROUND OF THE INVENTION

The subject matter herein relates generally to electrical connectors.

Electrical connectors are typically used to electrically couple various types of electrical devices to transmit signals between the devices. At least some known electrical connectors include a cable assembly having cables connected between the electrical device and the electrical connector. The cables each have a signal conductor or a differential pair of signal conductors surrounded by a shield layer that, in turn, is surrounded by a cable jacket. The shield layer includes a conductive foil, which functions to shield the signal conductor(s) from electromagnetic interference (EMI) and generally improve performance. A drain wire is provided at the cable core electrically connected to the conductive foil. At an end of the communication cable, the cable jacket, the shield layer, and insulation that covers the signal conductor(s) may be removed (e.g., stripped) to expose the signal conductor(s) and the drain wire. The exposed portions of the signal conductor(s) are then mechanically and electrically coupled (e.g., soldered) to corresponding conductors, such as signal pads of a circuit card. However, termination of the drain wire is problematic. Typically, the drain wire is soldered to a corresponding ground conductor, such as a ground pad of the circuit card or a ground bus. Soldering the drain wires is an extra step in assembly, increasing the assembly time and cost of assembly.

Accordingly, there is a need for an electrical connector having an improved ground structure.

BRIEF DESCRIPTION OF THE INVENTION

In one embodiment, a cable card assembly for an electrical connector is provided and includes a circuit card having an upper surface and a lower surface. The circuit card has a cable end and a mating end opposite the cable end. The circuit card has mating conductors at the mating end for mating with a mating electrical connector. The circuit card has cable conductors at the cable end. The cable card assembly includes cables terminated to the circuit card. The cables include signal conductors and ground shields surrounding the corresponding signal conductors to provide electrical shielding for the signal conductors. The signal conductors include exposed portions extending forward of the ground shields. The exposed portions are terminated to corresponding cable conductors. The cable card assembly includes a ground bus separate and discrete from the circuit card and is coupled to the circuit card. The ground bus is electrically connected to the ground shields to electrically connect the ground shields of the cables. The ground bus include a molded body includes tunnels receiving the exposed portions of corresponding signal conductors. The molded body is contoured to control impedance along the exposed portions of the signal conductors.

In another embodiment, a ground bus for a cable card assembly is provided and includes a circuit card and cables terminated to the circuit card. The ground bus includes a molded body having a front and a rear extending between an inner end and an outer end opposite the inner end. The molded body has a first side and a second side. The inner end is configured to be mounted to the circuit card. The molded body is configured to be electrically connected to ground shields of the cables. The molded body is electrically conductive to electrically connect the ground shields. The ground bus includes separating walls at the inner end forming tunnels. The tunnels are open at the rear to receive signal conductors of the corresponding cables of the cable card assembly. The separating walls provide electrical shielding for the signal conductors in the tunnels. The separating walls have variable thickness to contour the tunnels to control impedance along the signal conductors.

In a further embodiment, an electrical connector is provided and includes a housing having walls forming a cavity. The housing has a mating end at a front of the housing configured to be mated with a mating electrical connector. The electrical connector includes a cable card assembly received in the cavity of the housing. The cable card assembly includes a circuit card, cables terminated to the circuit card, and a ground bus coupled to the circuit card. The circuit card has an upper surface and a lower surface. The circuit card has a cable end and a mating end opposite the cable end. The circuit card has cable conductors at the cable end. The circuit card has mating conductors at the mating end. The mating end of the circuit card configured to be plugged into a card slot of the mating electrical connector. The cables include signal conductors and ground shields surrounding the corresponding signal conductors to provide electrical shielding for the signal conductors. The signal conductors have exposed portions extending forward of the cable shields. The exposed portions is terminated to corresponding cable conductors. The ground bus is electrically connected to the ground shields to electrically connect the ground shields of the cables. The ground bus include a molded body includes tunnels receiving the exposed portions of corresponding signal conductors. The molded body is contoured to control impedance along the exposed portions of the signal conductors.

DETAILED DESCRIPTION OF THE INVENTION

Figure 1:
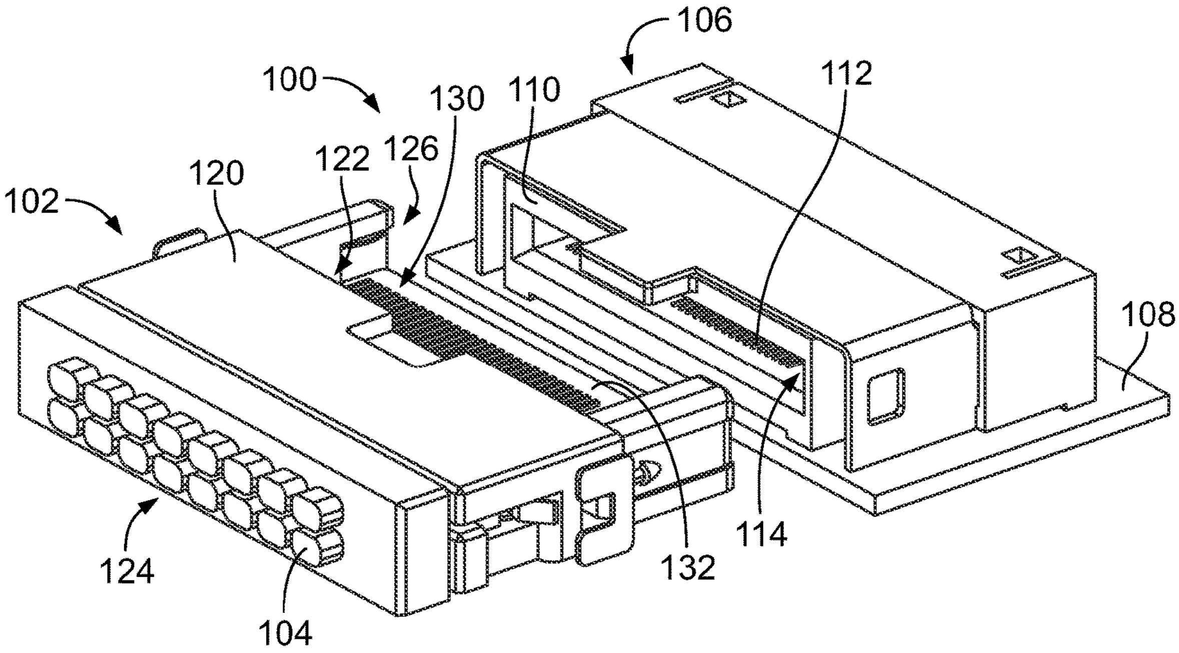
FIG. 1 is a perspective view of a communication system in accordance with an exemplary embodiment.

FIG. 1 is a perspective view of a communication system 100 in accordance with an exemplary embodiment. The communication system 100 includes a first electrical connector 102 provided at ends of cables 104 and a second electrical connector 106 mounted to a circuit board 108. In other various embodiments, the second electrical connector 106 may be provided at ends of cables (not shown). In an exemplary embodiment, the second electrical connector 106 is a receptacle connector, and may be referred to herein after as a receptacle connector 106. The first electrical connector 102 is mated to the second electrical connector 106. In an exemplary embodiment, the first electrical connector 102 is a plug connector configured to be pluggably coupled to the receptacle connector 106. For example, a portion of the plug connector 102 may be plugged into a receptacle of the receptacle connector 106. In an exemplary embodiment, the plug connector 102 is coupled to the receptacle connector 106 at a separable interface. For example, the plug connector 102 is latchably coupled to the receptacle connector 106. The connectors 102, 106 may be input-output (I/O) connectors.

The receptacle connector 106 includes a receptacle housing 110 holding an array of receptacle contacts 112. In an exemplary embodiment, the receptacle housing 110 includes a card slot 114 forming the receptacle receiving the plug connector 102. The receptacle contacts 112 have separable mating interfaces. The receptacle contacts 112 may define a compressible interface, such as including deflectable spring beams that are compressed when the plug connector 102 is received in the card slot 114. Optionally, the receptacle contacts 112 may be arranged in multiple rows along the top and the bottom of the card slot 114. In various embodiments, the receptacle connector 106 is a communication device, such as a card edge socket connector. However, the receptacle connector 106 may be another type of electrical connector in an alternative embodiment, such as a serial attached SCSI (SAS) connector. The receptacle connector 106 may be a high-speed connector.

The plug connector 102 includes a housing 120 having a cavity 122 that receives a cable card assembly 130. The housing 120 has a cable end 124 and a mating end 126 opposite the cable end 124. The cables 104 extend from the cable end 124. The mating end 126 is configured to be coupled to the receptacle connector 106. The cable card assembly 130 includes a circuit card 132. The cables 104 are configured to be terminated to the circuit card 132. The circuit card 132 is configured to be plugged into the card slot 114 when the plug connector 102 is mated with the receptacle connector 106.

Figure 2:
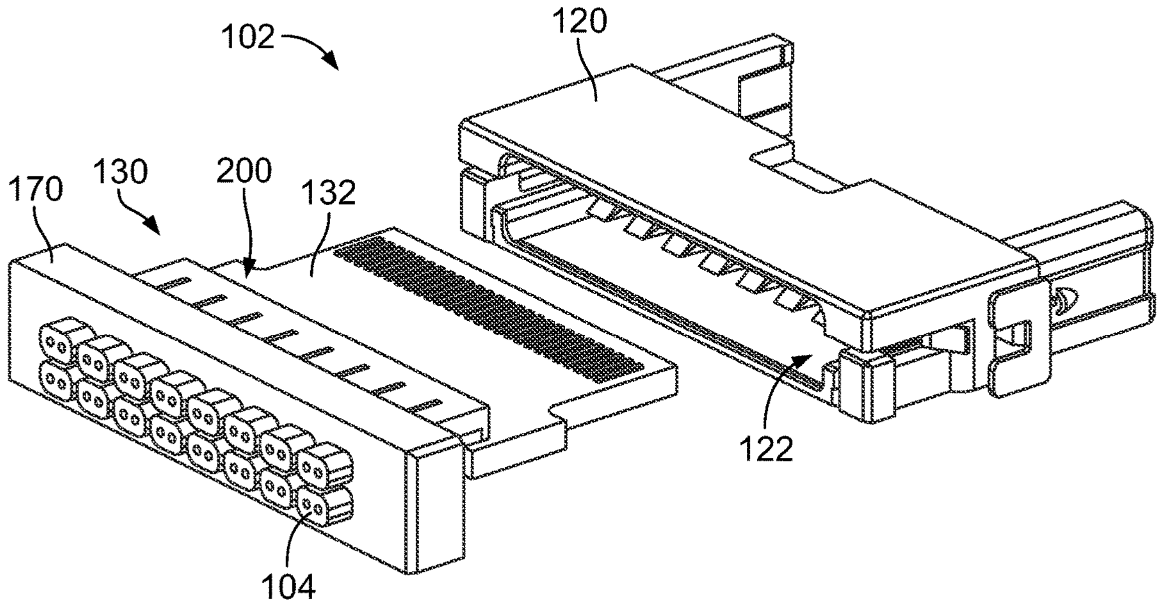
FIG. 2 is an exploded view of the plug connector in accordance with an exemplary embodiment.

FIG. 2 is an exploded view of the plug connector 102 in accordance with an exemplary embodiment. The plug connector 102 includes the housing 120 and the cable card assembly 130. The housing 120 receives the cable card assembly 130 in the cavity 122 to hold the circuit card 132 and the cables 104. In an exemplary embodiment, the cable card assembly 130 includes a ground bus 200 separate and discrete from the circuit card 132.

The ground bus 200 is coupled to the circuit card 132. The ground bus 200 may be electrically connected to the circuit card 132, such as to a ground plane of the circuit card 132. The ground bus 200 provides electrical shielding for the signal conductors of the cables 104. The ground bus 200 is electrically connected to the shield structures of the cables 104, such as to ground shields of the cables 104 and/or drain wires of the cables 104. In an exemplary embodiment, the ground bus 200 is soldered to the ground shields. However, the ground bus 200 may be electrically connected to the shield structure of the cable 104 by other means in alternative embodiments, such as soldering to the drain wire, welding to the drain wire, press-fitting the drain wire into a compliant feature of the ground bus 200, using conductive adhesive, using a conductive gasket, conductive foam, conductive epoxy, and the like. The ground bus 200 may be coupled to the circuit card 132 at a solderless connection, such as at an interference or press-fit connection. In various embodiments, multiple ground buses 200 may be provided, such as at top and bottom sides of the circuit card 132. The upper and lower ground buses 200 may be offset, such as shifted front-to-rear and/or side-to-side.

During assembly, after the cables 104 are terminated to the circuit card 132 and the ground bus 200, the cable card assembly 130 may be loaded into the housing 120, such as into a rear of the housing 120. The cable card assembly 130 may be secured in the housing 120 using latches, fasteners or other securing devices. In an exemplary embodiment, the ends of the cables 104 may be surrounded by a strain relief element 170. For example, the strain relief element 170 may be molded or otherwise formed around the cables 104. The strain relief element 170 may be secured to the circuit card 132, such as being molded to the circuit card 132. Optionally, multiple strain relief elements 170 may be provided, such as upper and lower strain relief elements.

Figure 3:
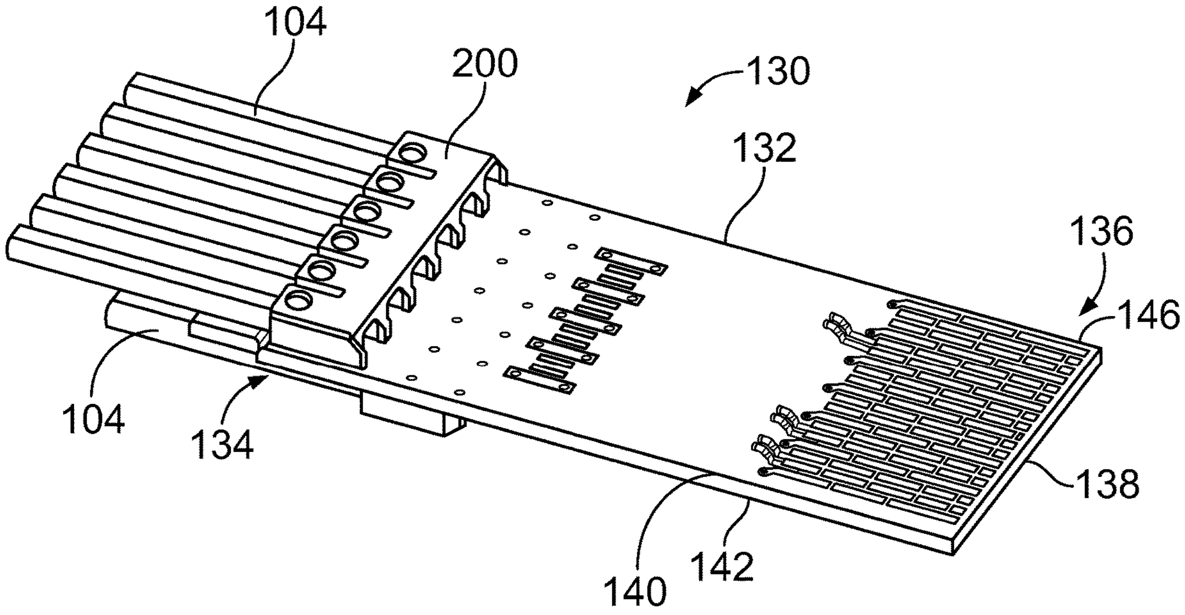
FIG. 3 is a perspective view of a portion of the cable card assembly in accordance with an exemplary embodiment.
Figure 4:
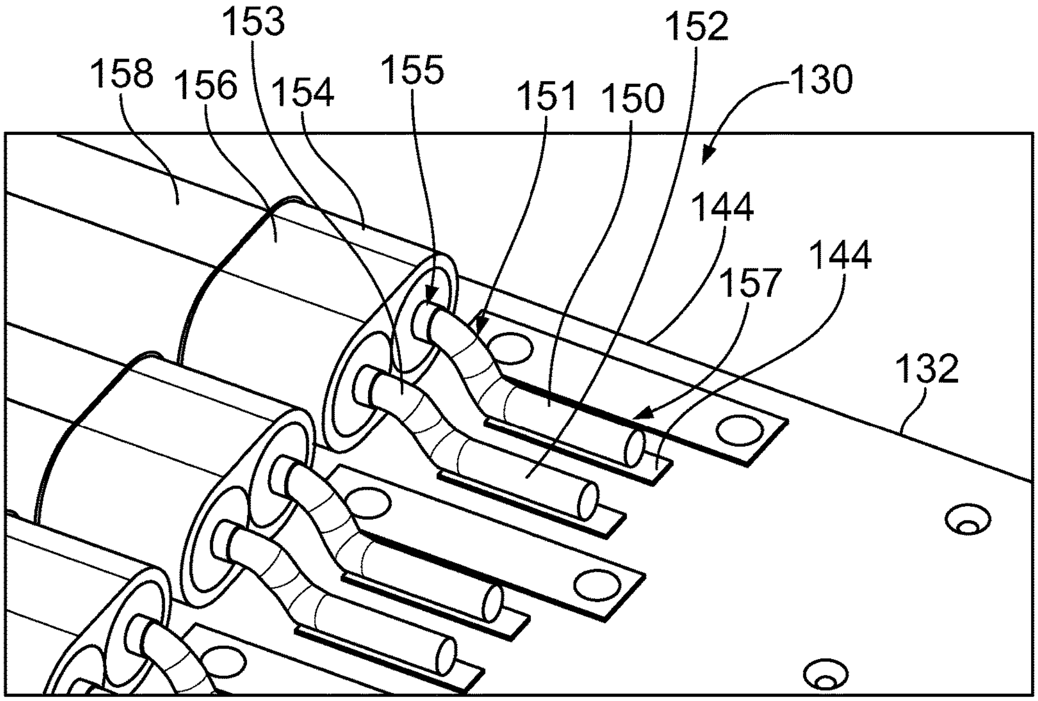
FIG. 4 is a perspective view of a portion of the cable card assembly in accordance with an exemplary embodiment with the ground bus removed to show the cables terminated to the circuit card.

FIG. 3 is a perspective view of a portion of the cable card assembly 130 in accordance with an exemplary embodiment. The cable card assembly 130 includes the circuit card 132, the cables 104 terminated to the circuit card 132, and one or more of the ground buses 200 (FIG. 3 illustrates an upper ground bus and a lower ground bus) coupled to the circuit card 132. FIG. 4 is a perspective view of a portion of the cable card assembly 130 in accordance with an exemplary embodiment with the ground bus 200 removed to show the cables 104 terminated to the circuit card 132.

The circuit card 132 extends between a cable end 134 and a mating end 136. The circuit card 132 has a card edge 138 at the mating end 136 configured to be plugged into the card slot 114 (shown in FIG. 1) of the receptacle connector 106 (shown in FIG. 1). The circuit card 132 includes an upper surface 140 and a lower surface 142. The circuit card 132 may have any reasonable length between the cable end 134 and the mating end 136, depending on the particular application, and may have electrical components mounted to the circuit card 132 between the cable end 134 and the mating end 136 (for example, FIG. 3 illustrates an elongated circuit card with electrical components mounted thereto whereas FIG. 2 illustrates a shortened circuit card without electrical components).

The circuit card 132 includes cable conductors 144 (FIG. 4) at the cable end 134 configured to be electrically connected to the signal conductors and shield structure of the cables 104. The cable conductors 144 may be pads or traces of the circuit card 132. The cable conductors 144 may be provided at both the upper surface 140 and the lower surface 142. The cable conductors 144 include both signal conductors and ground conductors. Optionally, the cable conductors 144 may be arranged in a ground-signal-signal-ground arrangement. The lengths of the signal conductors may be different than the lengths of the ground conductors. The widths of the signal conductors may be different than the widths of the ground conductors. The spacing between the signal conductors (i.e., pitch) may be different than the spacing between the signal conductors and the ground conductors. The circuit card 132 includes mating conductors 146 (FIG. 3) at the mating end 136 configured to be electrically connected to corresponding receptacle contacts 112 (shown in FIG. 1) of the receptacle connector 106. The mating conductors 146 may be pads or traces of the circuit card 132. The mating conductors 146 may be provided at both the upper surface 140 and the lower surface 142. The mating conductors 146 are provided proximate to the card edge 138.

The cables 104 are terminated to the circuit card 132 at the cable end 134. Each cable 104 includes at least one signal conductor and a shield structure providing electrical shielding for the at least one signal conductor. In an exemplary embodiment, the cables 104 are twin-axial cables. For example, each cable 104 includes a first signal conductor 150 (FIG. 4) and a second signal conductor 152 (FIG. 4). The signal conductors 150, 152 carry differential signals. The signal conductors 150, 152 are configured to be terminated to corresponding cable conductors 144 of the circuit card 132. For example, the signal conductors 150, 152 may be soldered to the cable conductors 144.

The cable 104 includes an insulator 154 surrounding the signal conductors 150, 152 and a cable shield 156 surrounding the insulator 154. The cable shield 156 provides circumferential shielding around the signal conductors 150, 152. The cable 104 includes a cable jacket 158 surrounding the cable shield 156. In various embodiments, the cable 104 includes a drain wire electrically connected to the cable shield 156. In alternative embodiments, the cable 104 is provided without a drain wire.

In an exemplary embodiment, the cable jacket 158, the cable shield 156, and the insulator 154 may be removed (e.g., stripped) to expose portions 151, 153 of the signal conductors 150, 152, respectively. The exposed portions 151, 153 of the signal conductors 150, 152 are mechanically and electrically coupled (e.g., soldered) to the corresponding cable conductors 144. In an exemplary embodiment, the exposed portions 151, 153 are manipulated and bent from insulator exit ends 155 to distal ends 157, which are soldered to the cable conductors 144. For example, the exposed portions 151, 153 are bent inward toward each other (distance between reduced for tighter coupling and smaller trace spacing) and bent toward the circuit card 132. As such, the exposed portions 151, 153 have a non-axial shape. The cable shield 156 does not extend along the exposed portions 151, 153 and thus are unshielded by the cable shield 156. The ground bus 200 extends along the exposed portions 151, 153 and provides shielding for the exposed portions 151, 153. The ground bus 200 is shaped and positioned relative to the exposed portions 151, 153 to control impedance along the signal paths. For example, the ground bus 200 is contoured along the interior of the ground bus 200 to maintain a target impedance along the signal paths (for example, 50 Ohms, 75 Ohms, 100 Ohms, and the like). The shape of the interior of the ground bus 200 is based on the expected shape of the exposed portions 151, 153 (the expected shape is based on the relative positions of the insulator exit ends 155 and the distal ends 157—for example, based on the size of the cable 104, such as the thickness of the insulator 154, the relative distance between the end of the insulator 154 and the cable conductors 144, and the spacing between the cable conductors 144).

Figure 5:
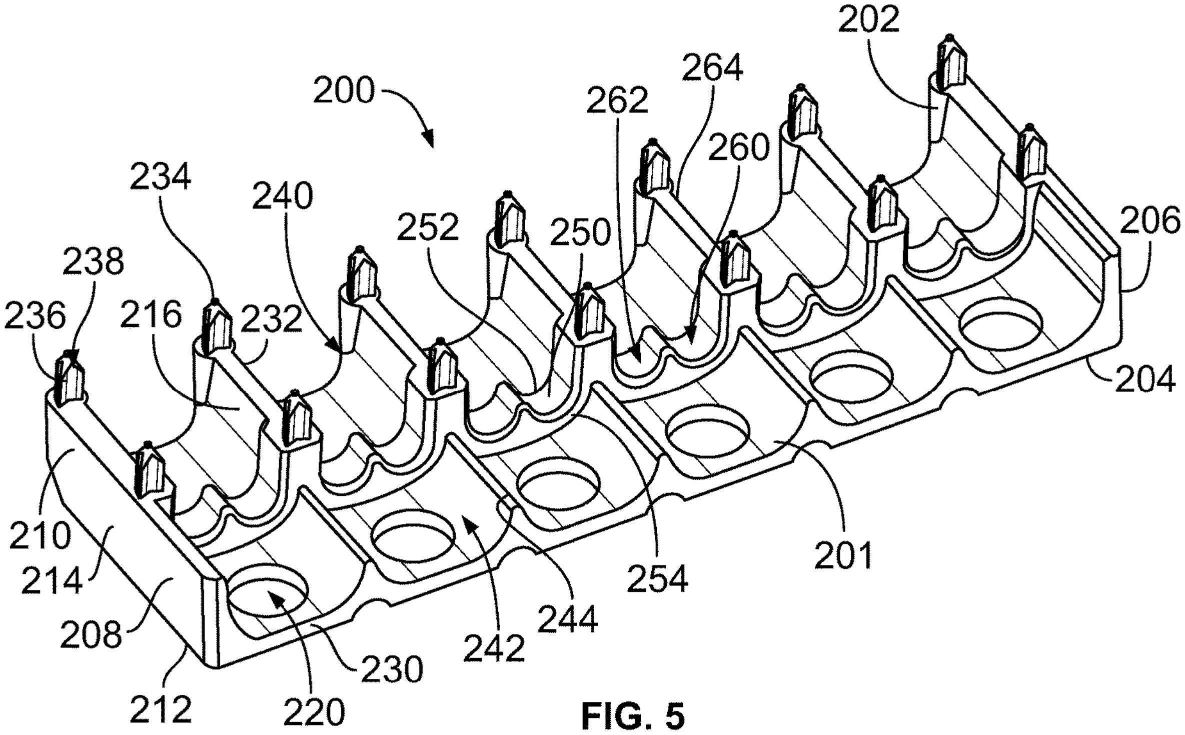
FIG. 5 is a rear perspective view of the ground bus in accordance with an exemplary embodiment.

FIG. 5 is a rear perspective view of the ground bus 200 in accordance with an exemplary embodiment. The ground bus 200 includes a molded body 201. The molded body 201 is conductive and used to provide electrical shielding for the cables 104 (shown in FIG. 4). The molded body 201 is a unitary, monolithic shield structure. In an exemplary embodiment, the molded body 201 is a die cast body. Alternatively, the molded body 201 may be injection molded, such as from a conductive plastic material. In other embodiments, the molded body is a plated plastic body.

The ground bus 200 extends between a front 202 and a rear 204. The ground bus 200 includes opposite first and second sides 206, 208. The ground bus 200 has a width between the sides 206, 208, which may be approximately equal to the width of the circuit card 132 (shown in FIG. 3). The ground bus 200 has an inner end 210 and an outer end 212 opposite the inner end 210. The inner end 210 is configured to face the circuit card 132. The ground bus 200 includes an exterior surface 214 and an interior surface 216. The interior surface 216 faces the cable 104, such as the signal conductors 150, 152. The interior surface 216 may be electrically coupled to the ground shield 156 of the cable 104.

The ground bus 200 may be used as an upper ground bus mounted to the upper surface 140 (shown in FIG. 3) of the circuit card 132 or as a lower ground bus mounted to the lower surface 142 (shown in FIG. 3) of the circuit card 132. The same ground bus 200 may be used as either the upper or lower ground bus. The inner end 210 of the upper ground bus 200 is a bottom configured to be mounted to the upper surface 140 of the circuit card 132, while the inner end 210 of the lower ground bus 200 is a top configured to be mounted to the lower surface 142 of the circuit card 132. The outer end 212 of the upper ground bus 200 is a top while the outer end 212 of the lower ground bus 200 is a bottom.

In an exemplary embodiment, the ground bus 200 includes openings 220 in the outer end 212. The openings 220 may be located proximate to the rear 204. The openings 220 provide access to the cables 104, such as to the ground shields or the drain wires. The openings 220 may receive solder for soldering the ground bus 200 to the ground shields or the drain wires. The ground bus 200 is terminated to the shield structures of the cables 104 in the openings 220. The electrical connections between the ground bus 200 and the shield structures of the cables 104 electrically commons each of the cables 104. Optionally, the ground bus 200 may include caps or covers (not shown) extending partially across the openings 220.

In an exemplary embodiment, the ground bus 200 includes an outer wall 230 extending between the front 202 and the rear 204. The outer wall 230 spans across the entire width of the ground bus 200 between the sides 206, 208. The outer wall 230 is provided at the outer end 212. The ground bus 200 includes separating walls 232 extend from the outer wall 230 to the inner end 210. The separating walls 232 form separate tunnels 240, which receive corresponding cables 104. The tunnels 240 are located interior of the outer wall 230. The tunnels 240 are surrounded by the outer wall 230 and the separating walls 232 to form shielded spaces for the cables 104. The outer wall 230 and the separating walls 232 provide shielding for the cables 104 in the tunnels 240. The separating walls 232 extend from the outer end 212 to the inner end 210. The separating walls 232 extend, at least partially, between the front 202 and the rear 204. The tunnels 240 are open at the rear 204 to receive the signal conductors 150, 152 (shown in FIG. 2) of the cables 104. Optionally, the tunnels 240 may be open at the front 202. Alternatively, the tunnels 240 may be closed at the front 202 by a front wall.

In an exemplary embodiment, the ground bus 200 includes mounting pins 234 at the inner end 210. The mounting pins 234 are configured to be coupled to the circuit card 132 (shown in FIG. 2). For example, the mounting pins 234 are configured to be received in plated ground vias of the circuit card 132. In an exemplary embodiment, the mounting pins 234 are press-fit into the ground vias to electrically connect the ground bus 200 to the circuit card 132. In an exemplary embodiment, the mounting pins 234 extend from the separating walls 232. Optionally, multiple mounting pins 234 may extend from each separating wall 232 to provide multiple points of mechanical and electrical contact for the ground bus 200. In an exemplary embodiment, the mounting pins 234 include press ribs 236 and grooves 238 between the press ribs 236. The press ribs 236 and the grooves 238 extend vertically. The press ribs 236 may be deformed when mating with the plated ground via of the circuit card 132. In an exemplary embodiment, the mounting pins 234 form a solderless connection between the ground bus 200 and the circuit card 132. For example, the mounting pins 234 are press fit into the plated vias of the circuit card 132 to create a mechanical and electrical connection between the ground bus 200 and the circuit card 132.

In an exemplary embodiment, the ground bus 200 includes cable pockets 242 at the rear 204. The cable pockets 242 receive corresponding cables 104. For example, the cable pockets 242 receive the insulators 154 and the ground shields 156 (both shown in FIG. 4). The openings 220 open to the cable pockets 242 to access the ground shields 156. The outer wall 230 defines the cable pockets 242 at the outer end 212. Side walls 244 extend from the outer wall 230 and extend between the cable pockets 242. The side walls 244 are aligned with the separating walls 232. The side walls 244 are configured to extend along sides of the ground shields 156. The cable pockets 242 have complimentary shapes to the cable shields 156 to interface with the cable shields 156 along a large surface area of the cable shields 156. The outer wall 230 and/or the side walls 244 may be soldered to the cable shield 156 in various embodiments.

The ground bus 200 includes constriction walls 250 extending into the tunnels 240. The constriction walls 250 reduce the size of the tunnels 240, such as to position the molded body 201 in closer proximity to the signal conductors 150, 152 for impedance control. Each constriction wall 250 includes a front face 252 and a rear face 254. The rear face 254 faces the cable pocket 242. In an exemplary embodiment, the rear face 254 of the constriction wall 250 abuts against the front of the insulator 154. The rear face 254 may form a locating surface for locating the ground bus 200 relative to the cables 104.

The constriction wall 250 includes a first well 260, a second well 262 and a bulge 264 between the first and second wells 260, 262. The first and second wells 260, 262 receive the first and second signal conductors 150, 152, respectively. The bulge 264 is located between the wells 260, 262 to provide shielding in close proximity to the signal conductors 150, 152. The wells 260, 262 and the front face 252 form portions of the interior surface 216 that face the signal conductors 150, 152. The wells 260, 262 and the front face 252 are contoured to control impedance along the signal paths. The contoured interior surface 216 control the positioning or spacing between the signal conductors 150, 152 and the shielding surface, which controls the impedance.

Figure 6:
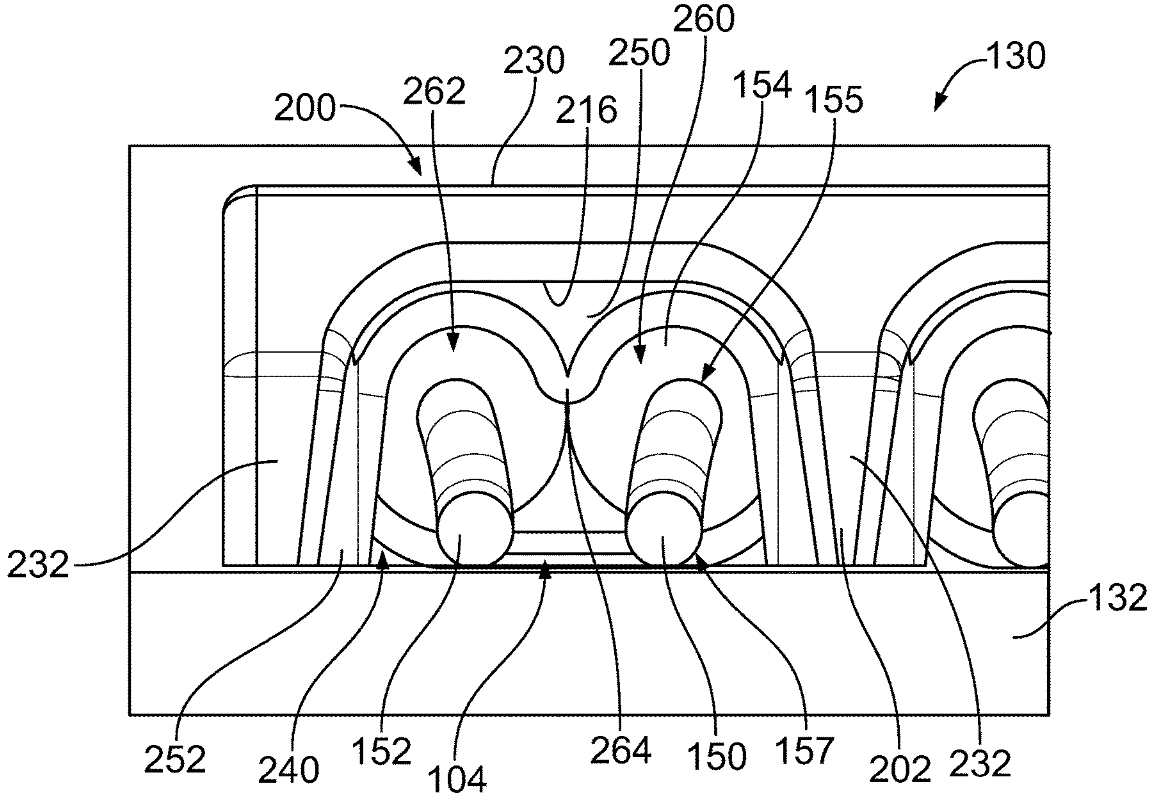
FIG. 6 is a front view of a portion of the cable card assembly in accordance with an exemplary embodiment showing the ground bus providing shielding for the cable.

FIG. 6 is a front view of a portion of the cable card assembly 130 in accordance with an exemplary embodiment showing the ground bus 200 providing shielding for the cable 104. The ground bus 200 is mounted to the circuit card 132. The signal conductors 150, 152 are terminated to the circuit card 132. The signal conductors 150, 152 may be soldered to the cable conductors on the circuit card 132.

The separating walls 232 provide shielding for the signal conductors 150, 152. The separating walls 232 are spaced apart from the signal conductors 150, 152. The separating walls 232 and the outer wall 230 are contoured to position (for example, spaced apart from) the shielding surface relative to the conductors 150, 152 for impedance control. For example, the separating walls 232 and the outer wall 230 may maintain a relative constant spacing from both conductors 150, 152, which extend along curved paths. The conductors 150, 152 extend through the wells 260, 262 in the constriction wall 250. The bulge 264 between the wells 260, 262 is aligned with the gap between the conductors 150, 152. The constriction wall 250 extends into the tunnel 240 to position the shielding surface in closer proximity to the conductors 150, 152 where the conductors 150, 152 exit the insulator 154 (for example, at the insulator exit ends 155 of the conductors 150, 152). As such, the tunnel 240 is narrower at the constriction wall 250 (for example, at the insulator exit ends 155 of the conductors 150, 152) as compared to at the front 202. The tunnel 240 is wider at the front 202, such as along the distal ends 157 of the conductors 150, 152 as compared to at the constriction wall 250. The tunnel 240 may be wider due to the additional solder that is added along the distal ends 157. The front face 252 of the constriction wall 250 may have a curved profile transitioning to the separating walls 232.

The interior surface 216 is contoured to control the spacing between the shielding surface and the conductors 150, 152, and thus the impedance along the signal paths, better than if the interior surface 216 were flat. The constriction wall 250 is aligned with the transition portions (the curved portions) of the conductors 150, 152, such as where the conductors 150, 152 exit from the end of the insulator 154 to portions of the conductors 150, 152 that are soldered to the circuit card 132. The constriction wall 250 is flared inward to locate the ground bus 200 closer to the conductors 150, 152 at the transition portions than at the solder portions, where the impedance is lower. The constriction wall 250 lower the impedance along the transition portions for impedance matching along the conductors 150, 152.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A cable card assembly for an electrical connector comprising:

a circuit card having an upper surface and a lower surface, the circuit card having a cable end and a mating end opposite the cable end, the circuit card having mating conductors at the mating end for mating with a mating electrical connector, the circuit card having cable conductors at the cable end;

cables terminated to the circuit card, the cables including signal conductors and ground shields surrounding the corresponding signal conductors to provide electrical shielding for the signal conductors, the signal conductors including exposed portions extending forward of the ground shields, the exposed portions being terminated to corresponding cable conductors; and a ground bus separate and discrete from the circuit card and being coupled to the circuit card, the ground bus being electrically connected to the ground shields to electrically connect the ground shields of the cables, the ground bus including a molded body including tunnels receiving the exposed portions of corresponding signal conductors, the molded body being contoured to control impedance along the exposed portions of the signal conductors, wherein the ground bus includes cable pockets at a rear of the ground bus shaped to follow contours of the ground shield to interface with an outer end and both sides of the ground shield.

2. The cable card assembly of claim 1, wherein the ground bus has a spacing between the molded body and the exposed portions of the signal conductors along the lengths of the exposed portions, the spacing being variable along the lengths of the exposed portions.

3. The cable card assembly of claim 1, wherein the exposed portion includes an insulation exit end and a distal end, the molded body being closer to the exposed portion at the insulation exit end compared to the distal end.

4. The cable card assembly of claim 1, wherein the ground bus includes a constriction wall and a front portion extending forward of the constriction wall to a front of the ground bus, the molded body being closer to the exposed portions along the constriction wall compared to along the front portion.

5. The cable card assembly of claim 4, wherein the constriction wall includes a first well and a second well with a bulge between the first well and the second well, the first well receiving a first signal conductor of the signal conductors, the second well receiving a second signal conductor of the signal conductors.

6. The cable card assembly of claim 4, wherein the constriction wall is located immediately forward of the ground shields.

7. The cable card assembly of claim 4, wherein the cable pockets are rearward of the constriction wall.

8. The cable card assembly of claim 1, wherein the ground bus includes cable pockets receiving the corresponding cables, each cable pocket defined by an end wall and sidewalls extending from the end wall, the end wall interfacing with an outer end of the corresponding cable, the side walls interfacing with opposing sides of the corresponding cable.

9. The cable card assembly of claim 8, wherein the end wall includes solder openings receiving solder to electrically connect the end wall to the ground shields.

10. The cable card assembly of claim 1, wherein the molded body includes an outer wall and separating walls extending from the outer wall, the separating walls and the outer wall forming the tunnels.

11. The cable card assembly of claim 10, wherein the molded body includes curved transitions between the outer wall and the separating walls.

12. The cable card assembly of claim 10, wherein the separating walls have variable thickness between a front and a rear of the ground bus.

13. The cable card assembly of claim 10, wherein the separating walls have interior surfaces facing the tunnels, the interior surfaces being nonplanar.

14. The cable card assembly of claim 1, wherein the molded body is a monolithic, unitary structure.

15. The cable card assembly of claim 1, wherein the molded body is a diecast body.

16. The cable card assembly of claim 1, wherein the ground bus extends between a front and a rear, the ground bus having an inner end mounted to the circuit card and an outer end opposite the inner end, the ground bus includes mounting pins extending from the inner end, the mounting pins being coupled to the circuit card.

17. The cable card assembly of claim 1, wherein the ground bus includes mounting pins received in ground vias of the circuit card, the mounting pins being press-fit into the ground vias to electrically connect the ground bus to the circuit card at solderless connections.

18. The cable card assembly of claim 1, wherein the tunnels extend between a rear and a front of the ground bus, the tunnels being separated by separating walls, each tunnel receiving a pair of the signal conductors, the separating walls providing electrical shielding between the pairs of the signal conductors.

19. A ground bus for a cable card assembly including a circuit card and cables terminated to the circuit card, the ground bus comprising:

a molded body having a front and a rear extending between an inner end and an outer end opposite the inner end, the molded body having a first side and a second side, the inner end configured to be mounted to the circuit card, the molded body configured to be electrically connected to ground shields of the cables, the molded body being electrically conductive to electrically connect the ground shields; and separating walls at the inner end forming tunnels, the tunnels being open at the rear to receive signal conductors of the corresponding cables of the cable card assembly, the separating walls providing electrical shielding for the signal conductors in the tunnels, the separating walls having variable thickness to contour the tunnels to control impedance along the signal conductors, wherein the tunnels include cable pockets at the rear of the ground bus shaped to follow contours of the ground shields to interface with an outer end and both sides of the ground shields.

20. An electrical connector comprising:

a housing having walls forming a cavity, the housing having a mating end at a front of the housing configured to be mated with a mating electrical connector; and a cable card assembly received in the cavity of the housing, the cable card assembly including a circuit card, cables terminated to the circuit card, and a ground bus coupled to the circuit card, the circuit card having an upper surface and a lower surface, the circuit card having a cable end and a mating end opposite the cable end, the circuit card having cable conductors at the cable end, the circuit card having mating conductors at the mating end, the mating end of the circuit card configured to be plugged into a card slot of the mating electrical connector, the cables including signal conductors and ground shields surrounding the corresponding signal conductors to provide electrical shielding for the signal conductors, the signal conductors having exposed portions extending forward of the cable shields, the exposed portions being terminated to corresponding cable conductors, the ground bus being electrically connected to the ground shields to electrically connect the ground shields of the cables, the ground bus including a molded body including tunnels receiving the exposed portions of corresponding signal conductors, the molded body being contoured to control impedance along the exposed portions of the signal conductors, wherein the ground bus includes cable pockets at a rear of the ground bus shaped to follow contours of the ground shield to interface with an outer end and both sides of the ground shield.

* * * * *